(12) United States Patent
Sukegawa et al.

(10) Patent No.: US 6,428,074 B1
(45) Date of Patent: Aug. 6, 2002

(54) CONSTRUCTION FOR FASTENING MEMBERS TOGETHER

(75) Inventors: Akihiro Sukegawa; Takashi Chirifu, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/654,513

(22) Filed: Sep. 1, 2000

(30) Foreign Application Priority Data

Sep. 2, 1999 (JP) ............................................ 11-248553

(51) Int. Cl.⁷ ............................................... B62D 27/00
(52) U.S. Cl. .......................... 296/29; 296/30; 296/194; 293/155; 52/731.6; 52/735.1; 52/787.12
(58) Field of Search ............................. 296/29, 30, 192, 296/194; 293/155; 52/731.6, 735.1, 787.12

(56) References Cited

U.S. PATENT DOCUMENTS

| | | | |
|---|---|---|---|
| 2,327,585 A | * 8/1943 | Ulrich | 296/29 |
| 3,596,978 A | * 8/1971 | Wessells, III et al. | 296/194 |
| 4,466,654 A | * 8/1984 | Abe | 296/192 |
| 5,624,150 A | * 4/1997 | Venier | 296/146.11 |
| 5,692,953 A | * 12/1997 | Bell et al. | 296/192 X |
| 6,237,304 B1 | * 5/2001 | Wycech | 296/30 X |

FOREIGN PATENT DOCUMENTS

| | | | | |
|---|---|---|---|---|
| JP | 404085183 A | * 3/1992 | | 296/192 |
| JP | 406191441 A | * 7/1994 | | 296/192 |
| JP | 406227429 A | * 8/1994 | | 296/194 |
| JP | 406247341 A | * 9/1994 | | 296/194 |

* cited by examiner

Primary Examiner—Joseph D. Pape
Assistant Examiner—Lori L Coletta
(74) Attorney, Agent, or Firm—Arent Fox Kintner Plotkin & Kahn, PLLC

(57) ABSTRACT

A construction is provided for fastening a plurality of members which thermally expand and contract together to a base member with a screw member, in such a manner that those members do not interfere with each other when they thermally expand or contract. An interference that would otherwise be generated between a plurality of members to be fastened together when the respective members thermally expand and contract can be prevented with a simple construction by interposing an interference preventing spacer member between the respective members. The spacer member is positioned in a radial direction relative to a screw portion. With one member, the fastened portion where the members are fastened together functions as a reference point for absorbing the thermal expansion and contraction. With the other member, an elongate hole is used at this fastened portion for absorbing the thermal expansion and contraction. Accordingly, the single fastened portion allows fastening corresponding to the respective members. Moreover, since there is caused no looseness of the respective members, there is no risk of the aesthetic appearance of the members being damaged which are so fastened together to the base member.

13 Claims, 3 Drawing Sheets

CONSTRUCTION FOR FASTENING MEMBERS TOGETHER

BACKGROUND OF THE INVENTION

The present invention relates to a construction for fastening together a plurality of members to a base member with a screw member, and more particularly to a construction for fastening members together which is effective in fastening together a plurality of members which thermally expand and contract in different direction from each other.

In a case where a plurality of members are fastened together to a base member with a screw member which are provided so as to extend, for example, in opposite directions to each other and are formed of, for example, resins which thermally expand and contract in different directions, since if the two members interfere with each other, not only is the aesthetic appearance of the members so fastened together damaged but also the durability of the respective members is affected, conventionally, the two members are both fixed rigidly and are supported such that the other portions of the members are allowed to expand and contract from the fixed point functioning as a reference point, the respective members are fastened together so as to produce a certain gap between the members, or the members are formed into shapes which allow the respective members to move in expanding and contracting directions, so that such expansion and contraction can be absorbed.

In a case where the members take complicated shapes, however, the expanding and contracting directions cannot always be controlled, and depending on a case, there is a risk of the aesthetic appearance of the members fastened together being damaged. In addition, when the members are fastened such that there is produced a certain gap between the respective members, there is caused looseness of the members, and this not only results in the lack of high quality feeling but also constitutes a cause of generating abnormal noise. When the members are formed into the shapes which allow the respective members to move in the expanding and contracting directions to thereby absorb such expansion and contraction, there is imposed a limitation to the shapes of the members or to directions in which the members are assembled together, and thus, there is caused a risk of the degree of freedom in designing shapes for the members being deteriorated or the assembly of the members becoming complicated.

SUMMARY OF THE INVENTION

The present invention was made with a view to solving the aforesaid problems which are inherent in the prior art, and an object of the invention is to provide a construction for fastening members together in which in a case where a plurality of members which thermally expand and contract are fastened together to a base member with a screw member, those members do not interfere with each other when they thermally expand or contract, which facilitates the assembly of the members and which does not damage the aesthetic appearance of the members so fastened together to the base member.

With a view to attaining the aforesaid object, according to the invention, there is provided a construction for fastening together a plurality of members (for example, a front pillar garnish and a fender member) which thermally expand and contract to a base member (for example, a body) with a screw member (for example, a nut member and a bolt), wherein an interference preventing spacer member such as a washer is interposed between the respective member which washer is positioned in a radial direction relative to the screw member.

With this construction, since the respective members do not interfere with each other, with one member, the fastened portion where the members are fastened together functions as a reference point for absorbing the thermal expansion and contraction, while with the other member, an elongate hole is used at this fastened portion for absorbing the thermal expansion and contraction, whereby the single fastened portion allows fastening corresponding to the respective members. Moreover, since there is caused no looseness of the respective members, there is no risk of the aesthetic appearance of the members being damaged which are so fastened together to the base member.

DETAILED DESCRIPTION OF THE PREFERRED EMBODIMENTS

Referring to the accompanying drawings, a preferred embodiment of the invention will be described in detail below.

Figure 1:
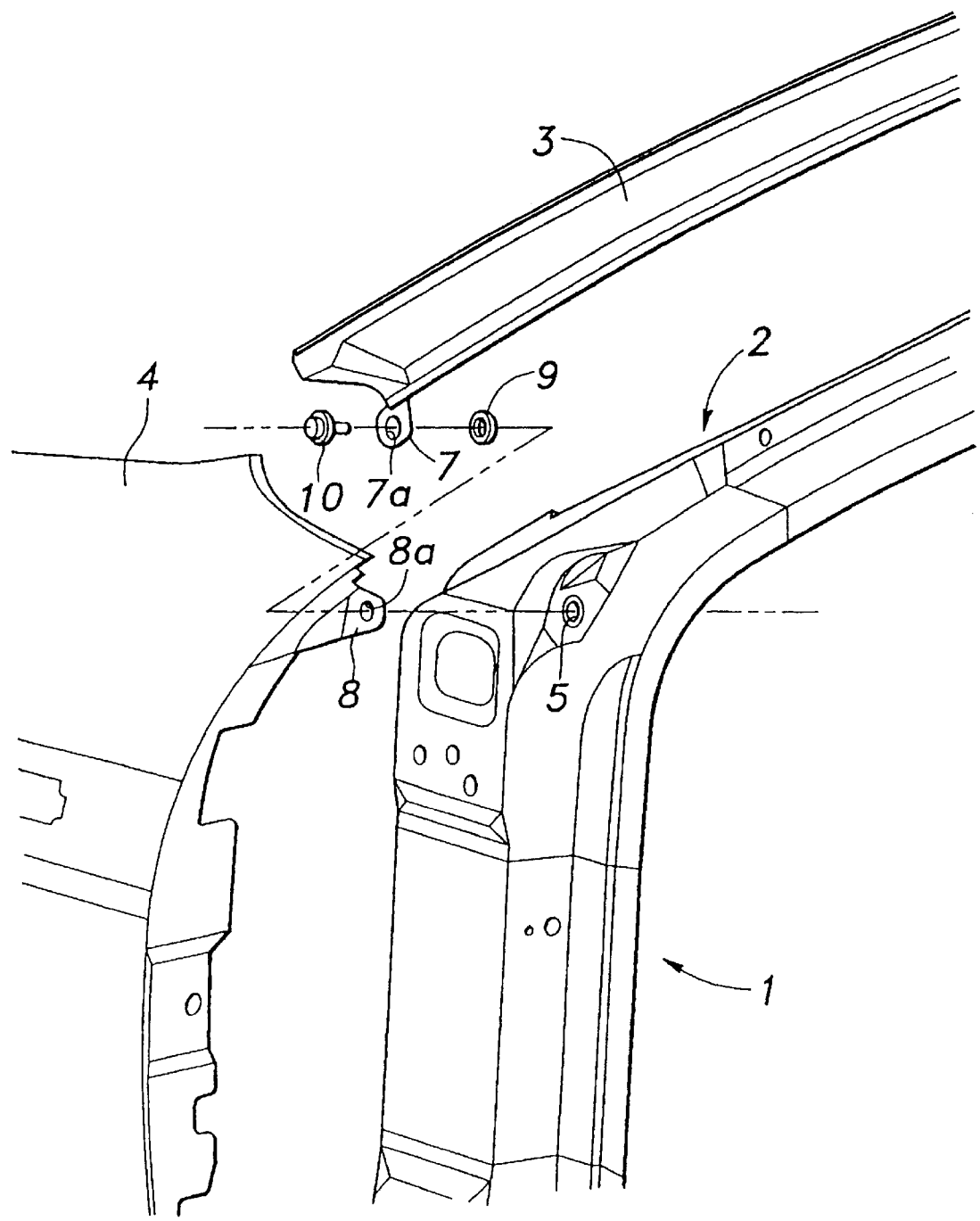
FIG. 1 is an exploded perspective view showing a main portion of a left front fender part of an automotive vehicle to which the invention is applied.
Figure 2:
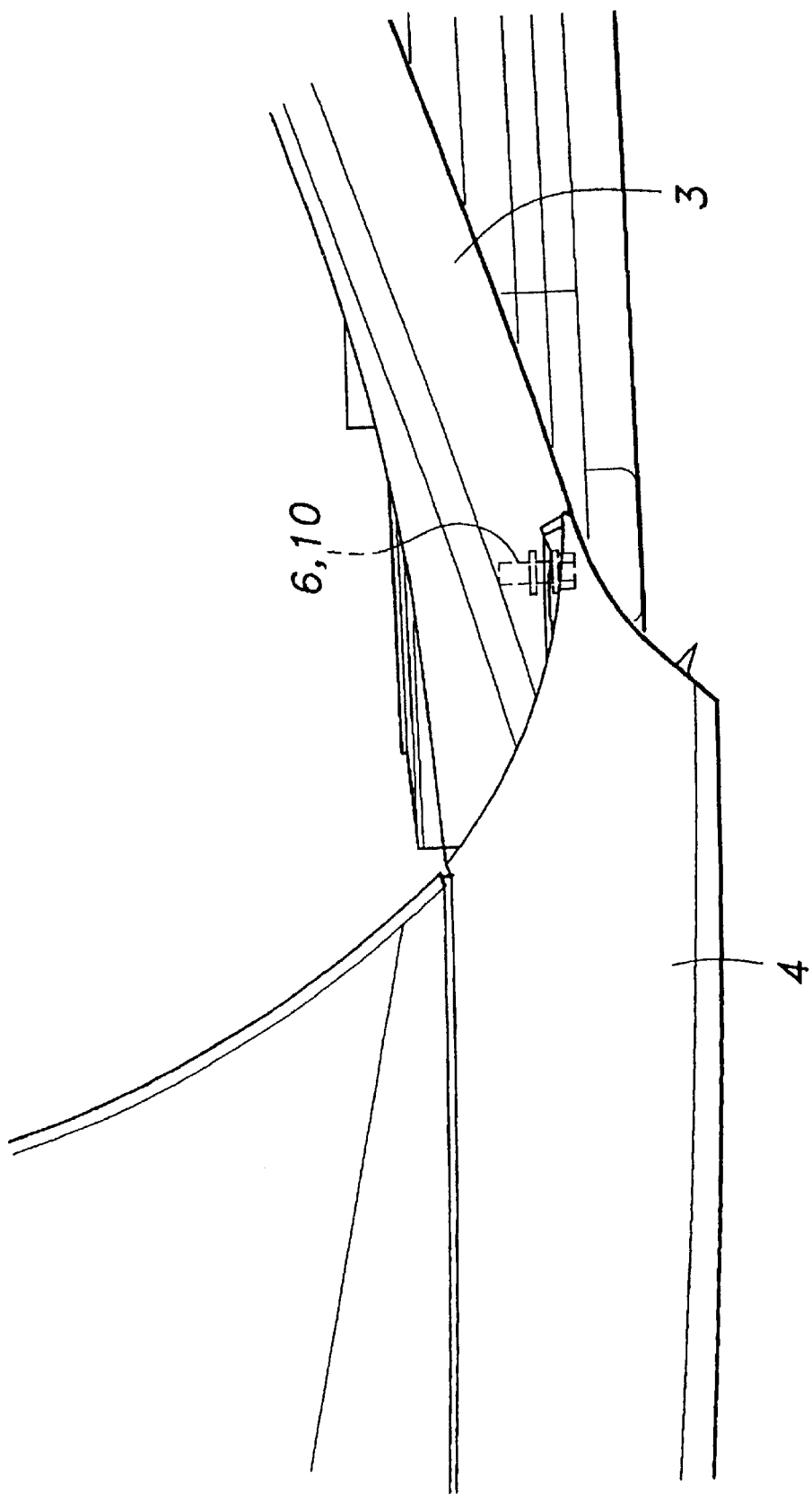
FIG. 2 is a plan view showing a state in which the respective members shown in FIG. 1 have been assembled together.

FIG. 1 is an exploded perspective view showing a main portion of a left front fender part of an automotive vehicle to which the invention is applied, and FIG. 2 is a plan view showing a state in which the assembly of respective members is completed. A front pillar 2 of a body 1 acting as a base member is covered with a front pillar garnish 3 formed of resin. Additionally, a fender member 4, which is similarly formed from resin, is attached to a proximal portion of the front pillar 2.

In this embodiment, the front pillar garnish 3 and the fender member 4 are thermally expanded and contracted in different directions.

Figure 3:
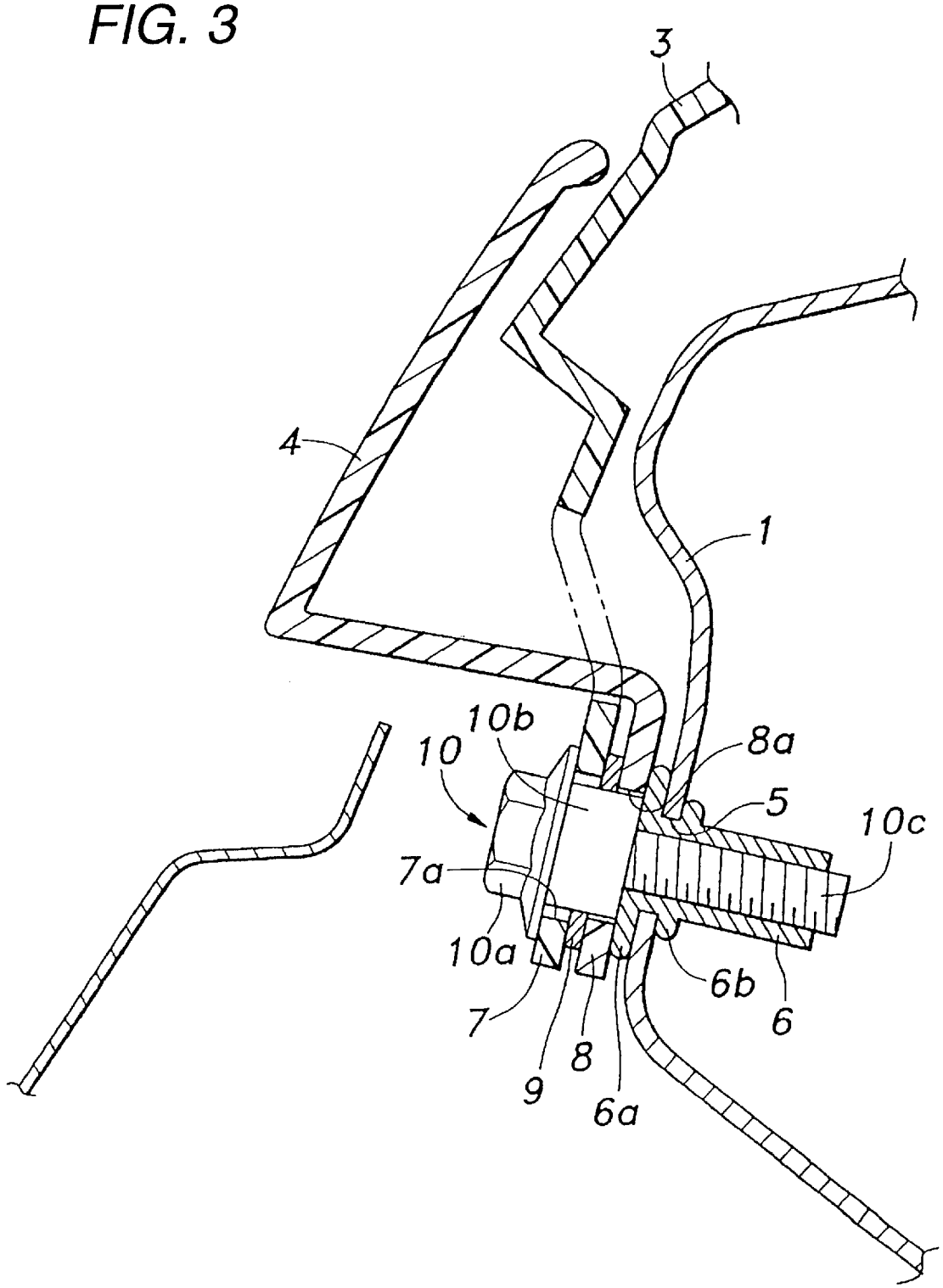
FIG. 3 is an enlarged sectional view showing a portion where the respective members are fastened together.

As shown in FIG. 3, as well, a fastening hole 5 is formed in the body 1 for attaching the front pillar garnish 3 and the fender member 4 to the body 1, and a nut member 6 is secured therein. The nut member 6 takes a cylindrical shape having an expanded head portion 6a, and a diametrically expanded portion 6b is formed on the nut member 6 when the nut member 6 is crimped in a state in which it is inserted through the hole 5, whereby the nut member 6 is prevented from being dislocated from the hole to thereby be fixed therein. Additionally, a fastening piece 7 having a fastening hole 7a is provided at a proximal portion of the front pillar garnish 3. Moreover, a fastening piece 8 having a fastening hole 8a is also provided on the fender member 4. Then, the front pillar garnish 3 and the fender member 4 are held together by fastening together the fastening piece 7 and the fastening piece 8 via a washer 9 interposed therebetween with a bolt 10 functioning as a screw member.

Here, the bolt 10 has a spacer portion 10b between its head portion 10a and threaded portion 10c, and the fastening piece 7, the washer 9 and the fastening piece 9 are received on this spacer portion 10b. The fastening amount is regulated by this spacer portion 10b, and therefore, there is no concern about a risk of the resin-made fastening piece 7 and fastening piece 8 being collapsed.

In this embodiment, the spacer portion 10b of the bolt 10 has a length in its axial direction which is set to be slightly smaller than the sum of the thickness of the fender member 4, the front pillar garnish 3 and the washer 9.

In addition, the inside diameter of the fastening hole 8a formed in the fastening piece 8 of the fender member 4 is substantially equal to the outer configuration of the spacer portion 10b, and its thermal expansion and contraction are constructed so as to be absorbed at the other portions thereof, not shown, with the fastened portion acting as a reference point. On the other hand, the fastening hole 7a formed in the fastening piece 7 of the front pillar garnish 3 is formed into an elongate hole which is made longer in directions in which the front garnish 3 thermally expands and contracts, its thermal expansion and contraction are constructed so as to be absorbed at the fastened portion.

Here, the interference between the front pillar garnish 3 and the fender member 4 is concerned about, but the washer 9 has an inside diameter substantially equal to the outside diameter of the spacer portion 10b and thus the washer 9 is constructed so as to move little in radial directions, whereby the front pillar garnish 3 is held between the head portion 10a of the bolt 10 and the washer 9, the fender member 4 between the washer 9 and the expanded head portion 6a of the nut 6, the front pillar garnish 3 and the fender 4 are not brought into direct contact with each other, and the washer 9 interposed therebetween does not move in the radial directions, whereby the two members do not affect each other even when they thermally expand and contract.

Note that while the two members such as the front pillar garnish 3 and the fender member 4 are used as members that are to be fastened together in the construction described above, three members may be fastened together with a similar interference prevention spacer member such as the washer 9 being interposed between the respective members.

As is clear from the above description, according to the construction for fastening members together of the invention, an interference that would otherwise be generated between a plurality of members to be fastened together when the respective members thermally expand and contract can be prevented with a simple construction by interposing the interference preventing spacer member between the respective members which spacer member is positioned in a radial direction relative to the screw portion, and thus, with one member, the fastened portion where the members are fastened together functions as the reference point for absorbing the thermal expansion and contraction, while with the other member, the elongate hole is used at this fastened portion for absorbing the thermal expansion and contraction, whereby the single fastened portion allows fastening corresponding to the respective members. Moreover, since there is caused no looseness of the respective members, there is no risk of the aesthetic appearance of the members being damaged which are so fastened together to the base member.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A fastening construction comprising:
   a base member;
   first and second members operative to thermally expand and contract;
   a screw member fastening said first and second members to said base member; and
   an interference preventing spacer member interposed between said first and second members in an axial direction of said screw member and positioned relative to said screw member in a radial direction of said screw member, so that upon thermal expansion and contraction, the first and second members do not affect each other.

2. The construction according to claim 1, wherein said first and second members are thermally expanded and contracted in different directions.

3. A fastening construction comprising:
   a vehicle body;
   a fender member and front pillar garnish thermally expanded and contracted;
   a screw member fastening said fender member and front pillar garnish to said vehicle body; and
   an interference preventing spacer member interposed between said fender member and said front pillar garnish in an axial direction of said screw member and positioned relative to said screw member in a radial direction of said screw member, wherein said fender member and front pillar garnish are thermally expanded and contracted in different directions.

4. The construction according to claim 3, wherein said screw member comprises a bolt and a nut,
   wherein said bolt comprises
   a spacer portion,
   a head portion having a diameter larger than said spacer portion, and
   a thread portion engaging with said nut and having a diameter smaller than said spacer portion, and
   wherein said nut is attached to said vehicle body.

5. The construction according to claim 4, wherein said spacer portion of said bolt has a length in its axial direction which is slightly smaller than the sum of the thickness of said fender member, said front pillar garnish and said interference preventing spacer member.

6. The construction according to claim 5, wherein said fender member is securely fastened at its fastening portion to said interference preventing spacer member in the radial direction so as to absorb the thermal expansion and contraction of said fender member by a remaining portion other than said fastening portion, and said front pillar garnish is loosely fastened at its fasten portion to said interference preventing space member in the radial direction so as to absorb the thermal expansion and contraction of said front pillar garnish by said fasten portion.

7. The construction according to claim 6, wherein said fastening portion of said fender member has a through hole with an inner diameter substantially equal to an outer diameter of said interference preventing spacer member, and said fasten portion of said front pillar garnish has an elongate hole which made longer in directions in which said front pillar garnish is thermally expanded and contracted.

8. The construction according to claim 7, wherein said interference preventing spacer member comprises a washer.

9. A fastening construction comprising:
   a base member;
   first and second members thermally expanded and contracted;
   a screw member fastening said first and second members to said base member; and
   an interference preventing spacer member interposed between said first and second members in an axial direction of said screw member and positioned relative to said screw member in a radial direction of said screw member, wherein said screw member comprises a bolt and a nut, wherein said bolt comprises:
  a spacer portion,
  a head portion having a diameter larger than said spacer portion, and
  a thread portion engaging with said nut and having a diameter smaller than said spacer portion, and
wherein said nut is attached to said base member.

10. The construction according to claim 9, wherein said spacer portion of said bolt has a length in its axial direction which is slightly smaller than the sum of the thickness of said first and second members and said interference preventing spacer member.

11. The construction according to claim 1, wherein said first member is securely fastened at its fastening portion to said interference preventing spacer member in the radial direction so as to absorb the thermal expansion and contraction of said first member by a remaining portion other than said fastening portion, and said second member is loosely fastened at its fasten portion to said interference preventing space member in the radial direction so as to absorb the thermal expansion and contraction of said second member by said fasten portion.

12. The construction according to claim 11, wherein said fastening portion of said first member has a through hole with an inner diameter substantially equal to an outer diameter of said interference preventing spacer member, and said fasten portion of said second member has an elongate hole which made longer in directions in which said second member thermally expands and contracts.

13. A fastening construction comprising:
  a base member;
  first and second members thermally expanded and contracted;
  a screw member fastening said first and second members to said base member; and
  an interference preventing spacer member interposed between said first and second members in an axial direction of said screw member and positioned relative to said screw member in a radial direction of said screw member, wherein said first and second members are not directly contacted with each other.

* * * * *